United States Patent
Milster et al.

(10) Patent No.: US 11,671,706 B2
(45) Date of Patent: Jun. 6, 2023

(54) OPTICAL DEVICE COMPRISING A MULTI-ORDER DIFFRACTIVE FRESNEL LENS (MOD-DFL) AND AN ACHROMATIZING COMPENSATION MECHANISM, AND A METHOD FOR ENHANCING IMAGES CAPTURED USING THE MOD-DFL

(71) Applicant: Arizona Board of Regents on Behalf of the University of Arizona, Tucson, AZ (US)

(72) Inventors: Thomas D. Milster, Tucson, AZ (US); Lee C. Johnson, Tucson, AZ (US); Daniel Apai, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 233 days.

(21) Appl. No.: 17/258,564

(22) PCT Filed: Jul. 9, 2019

(86) PCT No.: PCT/US2019/040968
§ 371 (c)(1),
(2) Date: Jan. 7, 2021

(87) PCT Pub. No.: WO2020/014203
PCT Pub. Date: Jan. 16, 2020

(65) Prior Publication Data
US 2021/0297601 A1 Sep. 23, 2021

Related U.S. Application Data

(60) Provisional application No. 62/695,531, filed on Jul. 9, 2018.

(51) Int. Cl.
*H04N 5/232* (2006.01)
*G02B 5/18* (2006.01)
(Continued)

(52) U.S. Cl.
CPC ....... *H04N 5/232133* (2018.08); *G02B 5/188* (2013.01); *G02B 5/189* (2013.01); *G02B 27/0056* (2013.01); *G06T 5/007* (2013.01)

(58) Field of Classification Search
CPC .............................................. H04N 5/232133
(Continued)

(56) References Cited

U.S. PATENT DOCUMENTS 5,117,306 A 5/1992 Cohen
5,589,982 A 12/1996 Faklis et al.
(Continued)

FOREIGN PATENT DOCUMENTS

CN 107076380 * 8/2017

OTHER PUBLICATIONS

International Search Report and Written Opinion dated Oct. 9, 2019 in co-pending PCT Application No. PCT/US2019/040968.

*Primary Examiner* — Joel W Fosselman
(74) *Attorney, Agent, or Firm* — Thomas Horstemeyer, LLP (57) ABSTRACT

An optical device is provided that comprises a multi-order diffractive Fresnel lens (MOD-DFL) and an achromatizing compensation mechanism that reduces refractive dispersion created by the MOD-DFL, thereby reducing the focal range of the MOD-DFL. A method is also provided of using the optical device in an image processing system to obtain images of an object and processing the images to perform image enhancement.

20 Claims, 9 Drawing Sheets

(51) Int. Cl.
*G02B 27/00* (2006.01)
*G06T 5/00* (2006.01)

(58) Field of Classification Search
USPC .......................................................... 348/345
See application file for complete search history.

(56) References Cited

U.S. PATENT DOCUMENTS

| | | |
|---|---|---|
| 5,818,634 A | 10/1998 | Richard et al. |
| 9,632,005 B1 | 4/2017 | Olczak |
| 2006/0050234 A1 | 3/2006 | Morris et al. |

* cited by examiner

OPTICAL DEVICE COMPRISING A MULTI-ORDER DIFFRACTIVE FRESNEL LENS (MOD-DFL) AND AN ACHROMATIZING COMPENSATION MECHANISM, AND A METHOD FOR ENHANCING IMAGES CAPTURED USING THE MOD-DFL

CROSS-REFERENCE TO RELATED APPLICATIONS

This application is a U.S. National Phase application under 35 U.S.C. § 371 of PCT international application PCT/US2019/040968 filed on Jul. 9, 2019, which claims priority to, and the benefit of the filing date of, U.S. Provisional Application having Ser. No. 62/695,531, filed on Jul. 9, 2018 and entitled "A MULTI-ORDER DIFFRACTIVE FRESNEL LENS (MOD-DFL) AND METHOD FOR ENHANCING IMAGES THAT ARE CAPTURED USING THE MOD-DFL," both of which are incorporated by reference herein in their entireties.

TECHNICAL FIELD

The present disclosure is directed to an optical device comprising a multi-order diffractive Fresnel lens (MOD-DFL) and an achromatizing compensation mechanism and to a method for enhancing images that are captured by the MOD-DFL.

BACKGROUND

Figure 1:
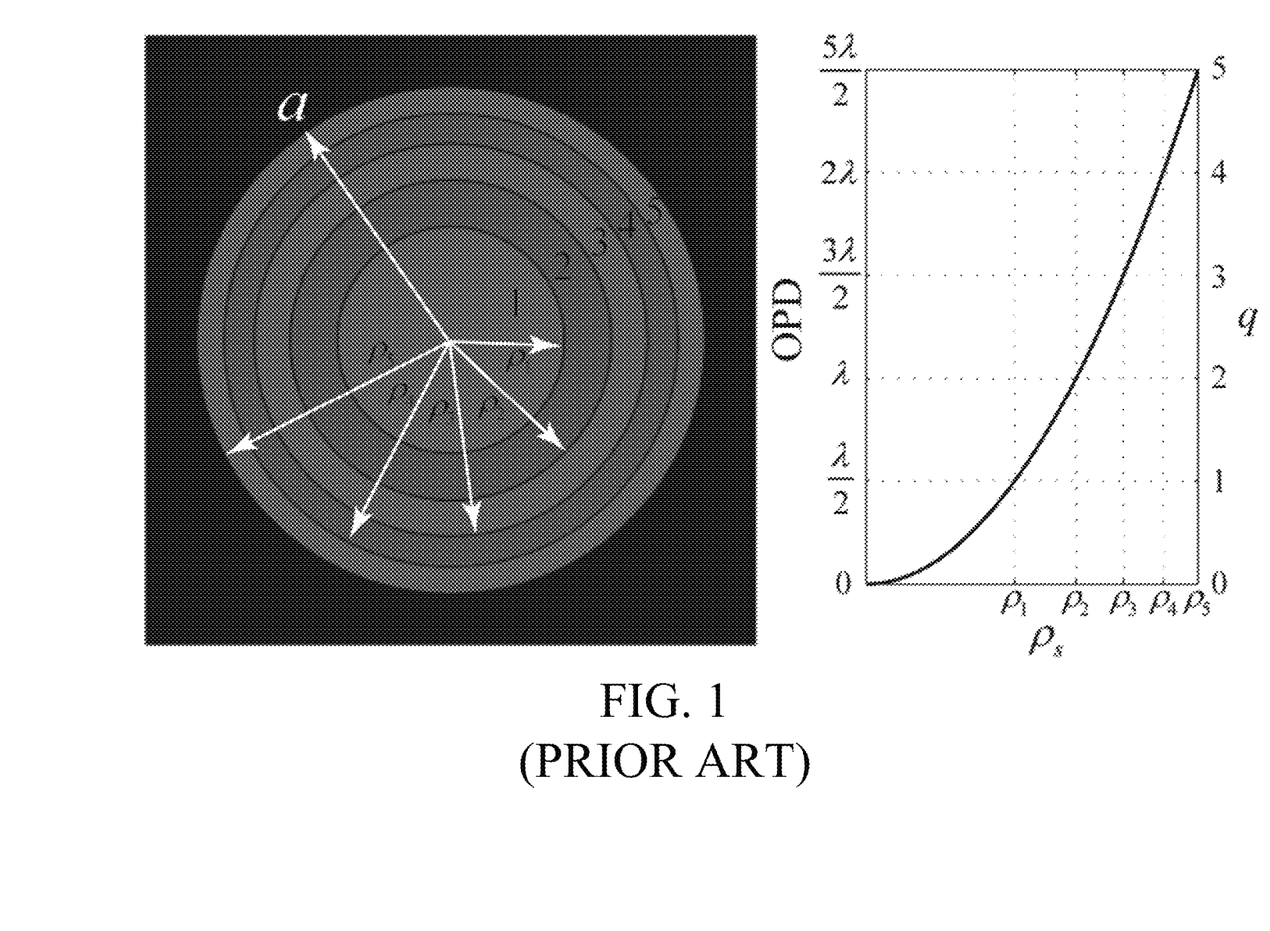
FIG. 1 is a diagram illustrating diffractive zones of a known diffractive optical element that performs lens-like functions by utilizing principles of wave combination.

Diffractive optical elements perform lens-like functions by utilizing principles of wave combination. Constructive wave combination, where two waves combine with crests and troughs arriving at the same time, leads to increased amplitude. Destructive wave combination, where a crest of one wave combines with a trough of the second wave, leads to low or zero amplitude. Light transmitted through an aperture that is illuminated by a distant star can be divided into equal-area Fresnel zones that identify which parts of the transmitted light interfere constructively at an on-axis observation point and which parts interfere destructively, as shown in FIG. 1, where $\rho_s$ is the radial coordinate from the vertex of the aperture and q is the number of waves of optical path difference (OPD). In this example, the first and second Fresnel zones produce a net zero light amplitude at the observation point, because the light from even-numbered zones (darker shade) combines destructively with light from odd-numbered zones (lighter shade) due to the OPD between them. Likewise, light from the third and fourth zones combine destructively, leaving only light from the fifth zone to produce non-zero light amplitude at the observation point.

The well-known Fresnel zone plate (FZP) operates by blocking only the even or odd zones in the aperture, thus producing only constructive wave combination at the observation point. By extending this argument to off-axis illumination, it is understood that the FZP acts as a lens with a focus spot size that is equivalent to a classical lens of the same diameter and focal length. The FZP is desired for applications where size and weight are critical factors in optical systems, because the FZP is a very thin optical element. However, due to the fact that other focal positions can be identified along the axis, the classical FZP produces large background levels at the primary focus. In addition, since the constructive or destructive nature of the wave combination depends on wavelength, the focal point changes dramatically with different wavelengths, with a focal length proportional to $1/\lambda$, where $\lambda$ is the wavelength. That is, as wavelength increases FZP focal length decreases, which is opposite the sense of a classical refractive lens.

Figure 2:
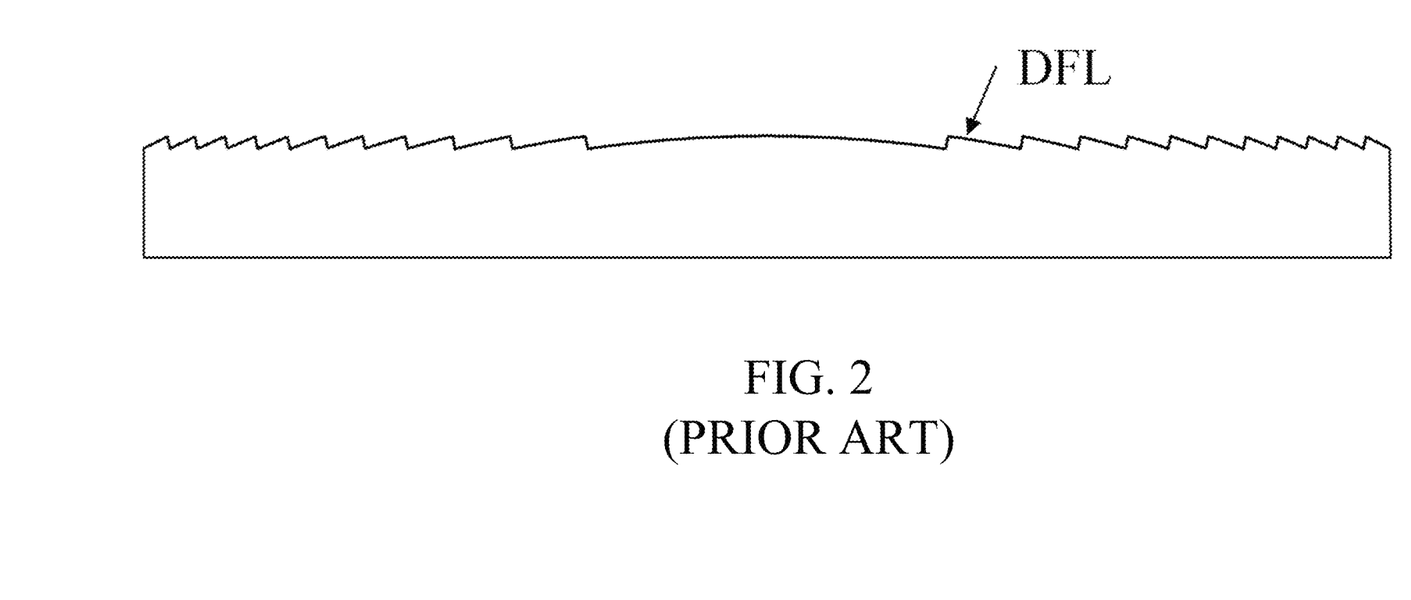
FIG. 2 is a cross-sectional side view of a known diffractive Fresnel lens (DFL).

In order to increase efficiency of diffracting light into the desired primary focal order, it is known to replace the FZP with a diffractive Fresnel Lens (DFL) shown in FIG. 2, in which the opaque-zone FZP is replaced by a transmissive phase pattern that changes OPD as a function of radius. Neighboring zones are combined into a single quadratic phase surface. The surface profile in each zone pair has a maximum of 1 wavelength of OPD across it. Although the DFL has the same chromatic dispersion properties of a FZP, diffraction efficiency into the desired focal order is much greater. In fact, under ideal conditions, all of the light is focused into the primary order. Since the step height to achieve 1 wave of OPD at the transitions is very small (about 1 micron for visible light), the DFL is an extremely thin, planar optical element.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

The present disclosure is directed to an optical device comprising a multiple-order diffractive Fresnel lens (MOD-DFL) and an achromatizing compensation mechanism that reduces refractive dispersion created by the MOD-DFL, thereby reducing the focal range of the MOD-DFL. The present disclosure is also directed to a method of using the optical device in an image processing system to obtain images of an object and processing the images to perform image enhancement.

A few representative embodiments of the optical device and of the system and method for making the optical device will now be described with reference to FIGS. 3-9, in which like reference numerals represent like components, elements or features. It should be noted that features, elements or components in the figures are not intended to be drawn to scale, emphasis being placed instead on demonstrating inventive principles and concepts. It should be noted that the inventive principles and concepts are not limited to the representative embodiments described herein, as will be understood by those of skill in the art in view of the description provided herein.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing device," as those terms are used herein encompass an electronic component that is able to execute a computer program or executable computer instructions. References herein to a system comprising "a processor" or "a processing device" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

Figure 3:
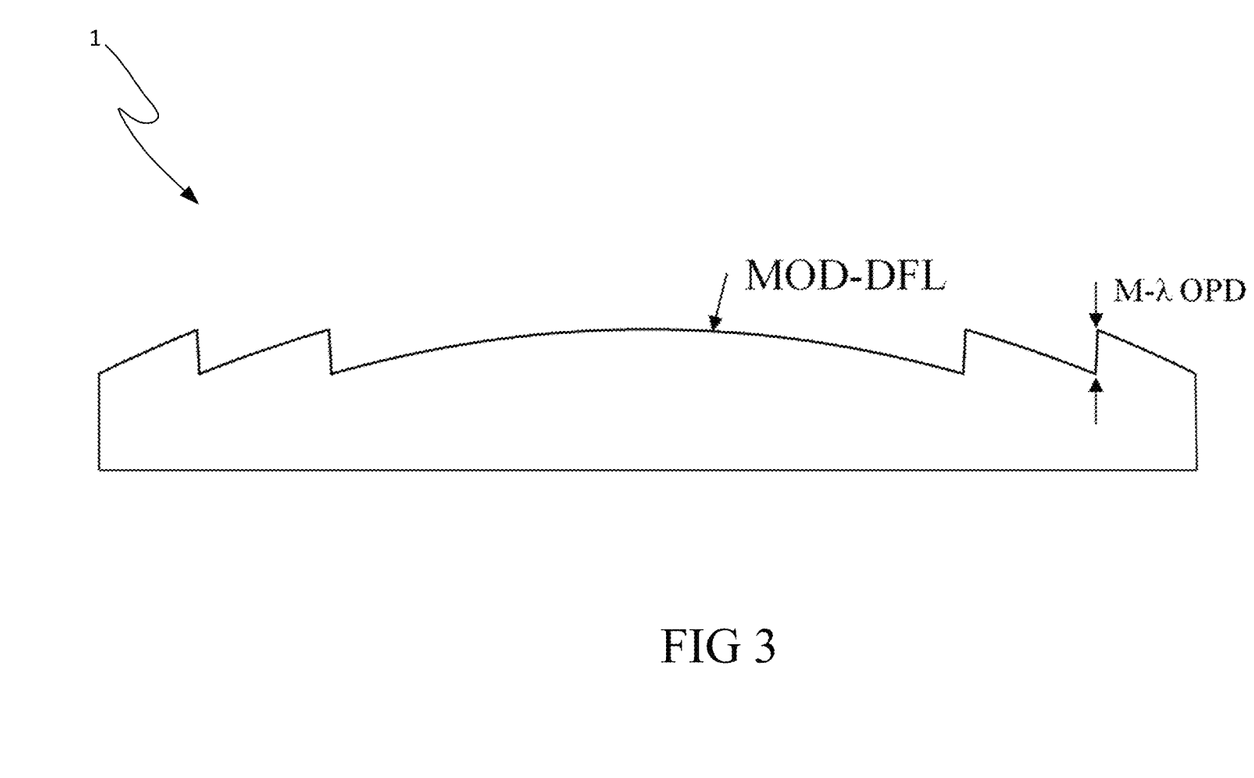
FIG. 3 is a cross-sectional side view of a multiple-order diffractive Fresnel lens (MOD-DFL).

FIG. 3 is a cross-sectional side view of a MOD-DFL 1 that was developed to improve chromatic focal dispersion. The MOD-DFL 1 is disclosed in PCT international application number PCT/US2019/039829 filed on Jun. 29, 2019 by the Applicant of the present application. Instead of setting phase transitions based on a single wave of OPD, phase transitions are defined based on integer multiples of M waves of OPD, where M is the MOD number. As shown in FIG. 3 for M=4, the MOD-DFL profile is thicker than the DFL by a factor of M and zone spacings are increased. However, even if M=1000, the transition step is only about 1 mm high for a visible light design. Therefore, the size and weight advantage of FZPs are retained for large-diameter MOD-DFL optical elements. The MOD-DFL operates over a set of higher diffracted orders where each order contains a wavelength of peak diffraction efficiency and each of these wavelengths come to a common focus. Intermediary wavelengths exhibit strong chromatic dispersion but, interestingly, the maximum focal dispersion of the MOD-DFL is decreased to a range of approximately f/M compared to the large range of a DFL. For example, a MOD-DFL having an f=5 meter (m) focal length and M=1000 would have a focal range of 5.0 m+/−0.005 m over a wavelength range from 500 nanometers (nm) to 1000 nm, whereas a DFL would have a focal range of approximately 5.0 m+/−3.0 m over the same range of wavelengths. Large-diameter MOD-DFLs require special considerations, as discussed in PCT international application number PCT/US2019/039829.

Figure 4:
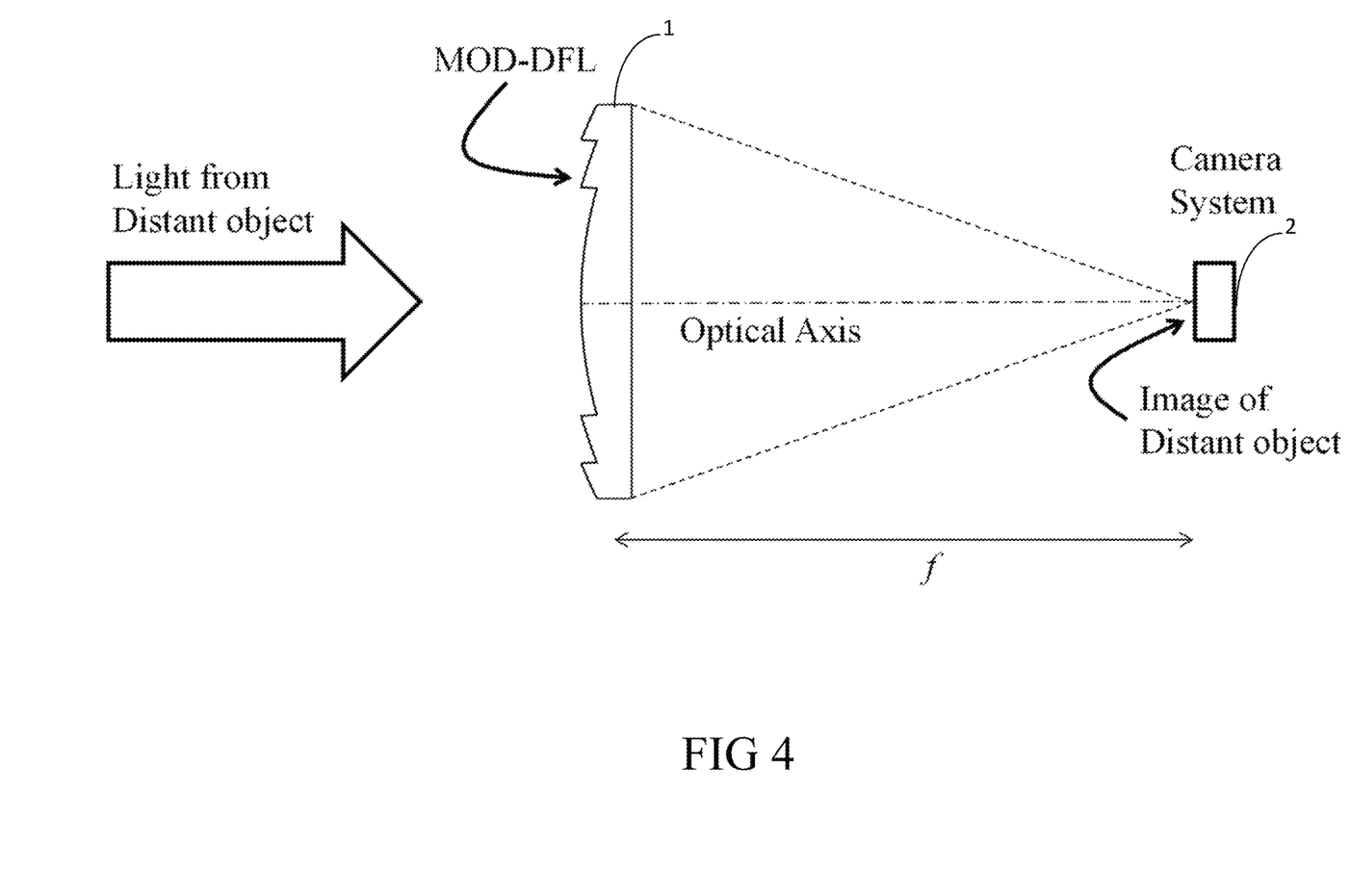
FIG. 4 is a system diagram of a simple optical system comprising the MOD-DFL shown in FIG. 3 and a camera that captures an image of a distant object focused on the camera plane.

FIG. 4 is a system diagram of a simple optical system comprising the MOD-DFL 1 shown in FIG. 3 and a camera 2, where the image of the distant object is focused on the camera plane. The Strehl Ratio (SR) is a common performance metric applied to optical systems, where SR=1 indicates perfect performance. Although the minimum value of SR=0, this value does not mean that the optical system cannot form an image. Image recovery can typically be accomplished through computer algorithms designed for this purpose. For MOD-DFLs, the value of SR changes with incident wavelength and defocus of the camera plane.

Figure 5:
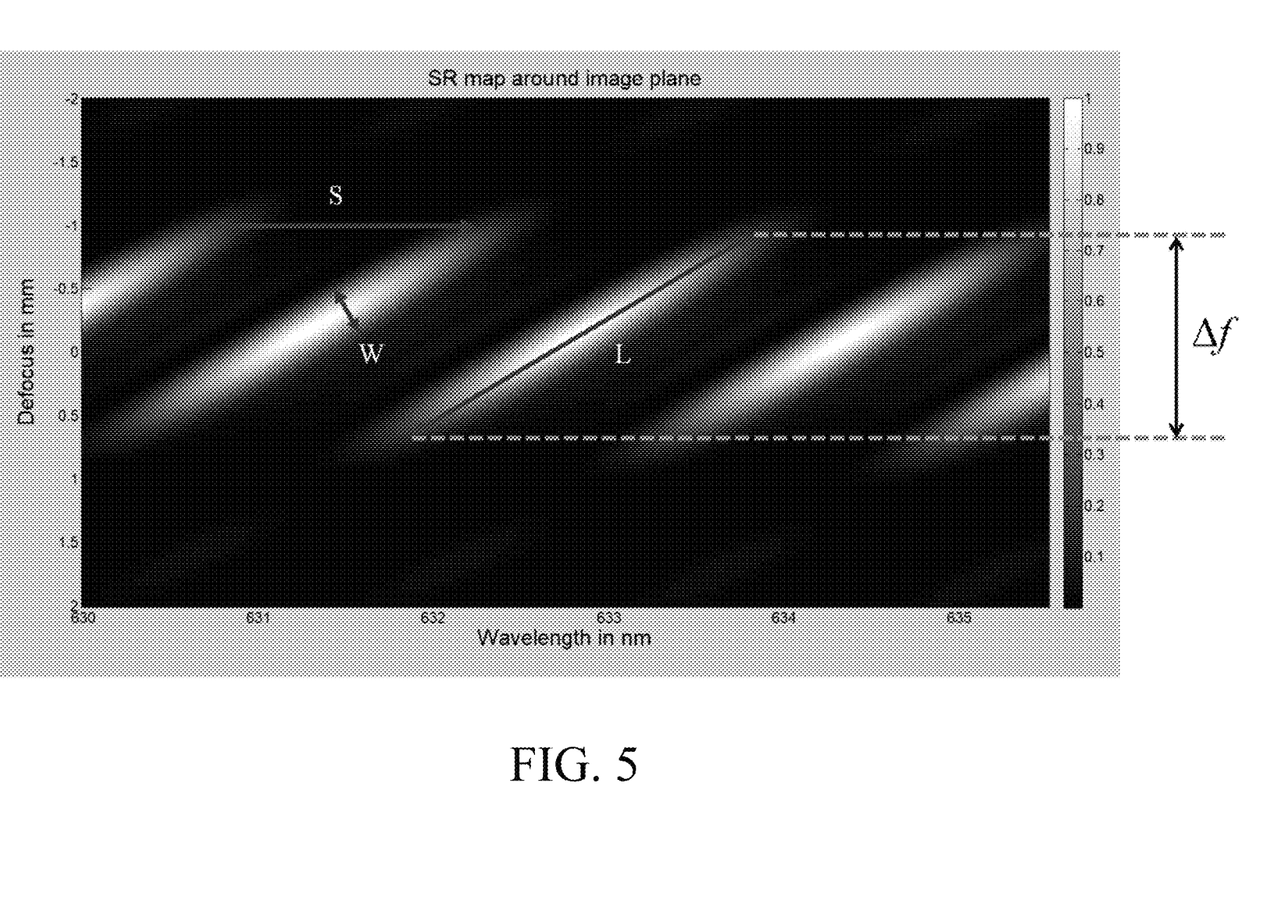
FIG. 5 is a plot of SR versus wavelength and defocus from the primary focal plane for an M=400 MOD-DFL designed at a primary wavelength of 633 nm and f=0.5 m.
Figure 6:
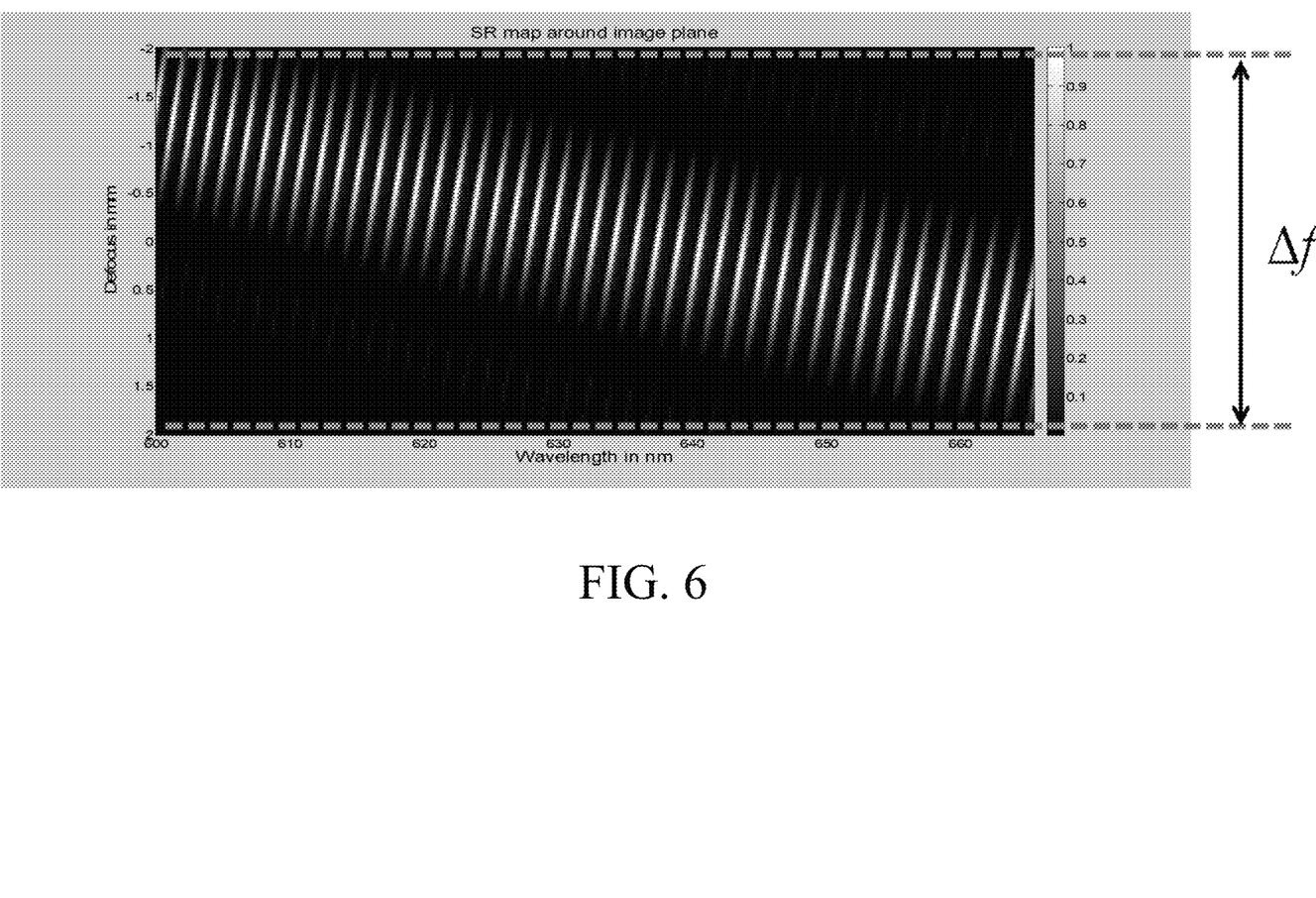
FIG. 6 is an expanded-range plot of SR versus wavelength for a MOD-DFL having a focal range $\Delta f$ of approximately 4 mm over a wavelength range from about 600 nm to 670 nm.

A useful analysis tool for MOD-DFLs that demonstrates their chromatic behavior is a plot of SR versus wavelength and defocus from the primary focal plane, as shown in the gray-scale graph of FIG. 5 for an M=400 lens designed at a primary wavelength of 633 nm and f=0.5 m. In this figure, a white color indicates SR=1, as shown on the right-hand side in the colorbar. Defocus is shown on the vertical axis, and wavelength is shown on the horizontal axis. In FIG. 5, the wavelength axis extends from about 630 nm to 636 nm. The defocus extends from −2 mm to +2 mm along the optical axis. Nearly periodic slanted elliptical regions of SR>0 are characteristic of the MOD-DFL. The length L of the primary axis of the ellipse and ellipse separation S are inversely proportional to the harmonic order M. The ellipse width W is directly proportional to the f/# of the optical system. The focal range Δf of the ellipse projected onto the vertical defocus is approximately 1.2 mm.

Design of a MOD lens for a particular application typically begins with the same desired first-order properties as a traditional refractive lens, such as the operating wavelengths and focal length. A single primary wavelength is chosen to determine the cutoff locations for the diffractive component. Generally, this is the central wavelength when designing for broadband performance. Transition depths are defined based on the formula $$M\frac{\lambda}{n_2 - n_1}$$

where $n_2$ and $n_1$ are the refractive index of the lens material and the incident refractive index, respectively, and $\lambda$ is the wavelength. Transition locations are based on integer multiples of M waves of OPD for on axis rays. The individual zones can then be modelled and optimized in standard lens design software.

The physical step height on each zone may be slightly different, depending on the aspheric coefficients of the design and reasonable manufacturing tolerances of around 50 nm. For a singlet design, refractive dispersion quickly becomes an undesirable characteristic of the MOD-DFL over bandwidths much larger than the ellipse separation S. As shown in the expanded-range SR graph of FIG. 6, the focal range Δf of the ellipse projected onto the vertical defocus is approximately 4 mm over a wavelength range from about 600 nm to 670 nm, which is much larger than the small-wavelength-bandwidth focal range of FIG. 5. In practice, this increase in focal range is detrimental to most imaging systems. It is caused by refractive dispersion from the MOD-DFL lens material. Because of this increase in focal range, a need exists for a MOD-DFL having reduced refractive dispersion, and consequently, a reduced focal range.

Figure 7:
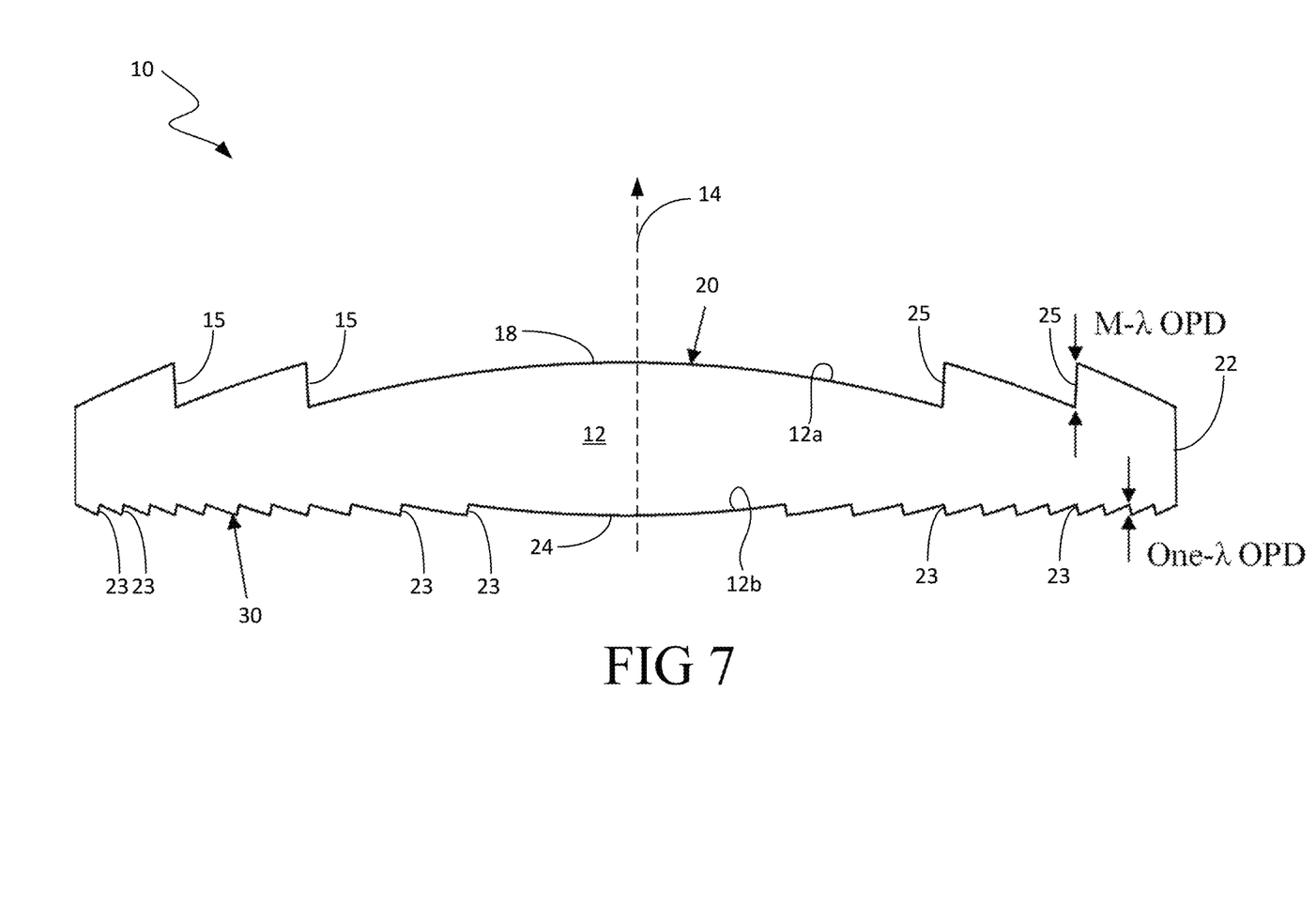
FIG. 7 is a side cross-sectional view of an optical device in accordance with a representative embodiment.

FIG. 7 is a side cross-sectional view of an optical device 10 in accordance with a representative embodiment comprising a MOD-DFL 20 and a DFL 30. An optical substrate 12 of the optical device 10 has a top surface 12a and a bottom surface 12b. A surface profile is formed in the top surface 12a and is radially symmetric relative to a center axis 14 of the MOD DFL 20 of the optical device 10. The surface profile comprises N transitions 15 in the top surface 12a at N radial positions, respectively, from the center axis 14, where N is a positive integer that is greater than or equal to 2. Each of the transitions 15 occurs at a respective zone boundary and has a step height in a direction nearly parallel to the center axis 14. In accordance with this embodiment, adjacent transitions 15 are father apart near the center axis 14 and are closer together near the edge 22.

The surface profile having this configuration comprises the MOD-DFL 20. In accordance with this representative embodiment, the surface profile includes a continuous curve 18 from the center axis 14 to a closest of the N transitions 15 to the center axis 14. In accordance with a representative embodiment, the portion of the surface profile that is the continuous curve 18 is aspherical in shape. The thickness of the optical device 10, which is approximately equal to the distance between surfaces 12a and 12b, is typically many times smaller than the radial distance from the center axis 14 to the outer edge 22 of the MOD-DFL 20, so as to make a lightweight lens structure.

The MOD-DFL 20 typically has an order, M, that is greater than or equal to 50 and the transitions 15 have a step height that is typically greater than or equal to 0.05 mm. In order to show both the MOD-DFL 20 and the DFL 30 in the FIG. 7, a value of M=4 was used, which would only lead to a step height of 4 micrometers. For practical purposes, however, the step height is typically greater than or equal to 0.05 mm. The step height may be calculated a $$\text{step height} = M\frac{\lambda}{n_2 - n_1} = 0.5 \text{ mm for } M = 500,$$

$$\lambda = 500 \text{ nm}, n_2 = 1.5 \text{ and } n_1 = 1.$$

The physical step height on each zone may be slightly different, depending on the aspheric coefficients of the design and reasonable manufacturing tolerances of around 50 nm.

The MOD-DFL 20 may be made by different processes including, for example, photolithography, diamond turning, molding, and epoxy replication. In order to make the MOD-DFL 20 with a desired precision, the manufacturing process typically includes using diamond turning to make a mold master and using the mold master to form a MOD-DFL replicate out of an optical material, such as an optical epoxy or polymer.

In accordance with the representative embodiment shown in FIG. 7, the bottom surface 12b of the optical substrate 12 has a surface profile formed therein that comprises the DFL 30. The DFL 30 is designed and manufactured to provide achromatizing compensation for refractive dispersion of the MOD-DFL 20 formed on the opposite surface 12a. The combination of these surfaces in a thin lens element is effectively an engineered material, or an EnMat. Therefore, the optical device 10 is a MOD-Enmat that has a large diameter-to-thickness ratio of greater than or equal to 100 for large-diameter (greater than or equal to 0.25 m) elements.

The surface profile of the DFL 30 comprises P transitions 23 in the bottom surface 12b at P radial positions, respectively, from the center axis 14, where P is a positive integer that is greater than or equal to 2. Each of the transitions 23 occurs at a respective zone boundary and has a step height in a direction nearly parallel to the center axis 14. In accordance with this representative embodiment, the surface profile on the bottom surface 12b includes a continuous curve 24 from the center axis 14 to a closest of the N transitions 23 to the center axis 14. In accordance with a representative embodiment, the portion of the surface profile that is the continuous curve 24 is aspherical in shape. In accordance with this embodiment, adjacent transitions 23 are father apart near the center axis 14 and are closer together near the edge 22.

The DFL 30 typically has an order, Q, that is greater than or equal to one and the transitions 23 have a step height that is typically much smaller than the step height of the transitions 15 of the MOD-DFL 20. The step height of the transitions 23 is typically greater than or equal to one micrometer and may be calculated as $$\text{step height} = \frac{\lambda}{n_2 - n_1}.$$

In embodiments in which there is an interest in maintaining minimum weight and thickness for the optical device 10, the DFL 30 located on the bottom surface 12b is configured to have negative dispersion whereas the MOD-DFL 20 located on the top surface 12a creates positive refractive dispersion. This behavior may be incorporated into the design by using a Sweatt model surface in lens design software, in which a fictitious glass with index approximately equal to the wavelength in nm is used to allow for significant optical power to exist in a very thin region. The Sweatt model surface is later converted into a physical surface by wrapping the OPD it produces into the diffractive pattern. The MOD-DFL 20 cannot be modelled as a Sweatt model surface as it no longer has a negligible physical thickness.

Following optimization in lens design software, the design preferably is verified using a physical optics simulation to confirm the diffractive performance. The optical path length may be determined at the exit pupil reference sphere using ray tracing. A Hankel transform calculation may be used to determine field values at a sampled image plane. The magnitude squared of these field values provides the irradiance which represents the point spread function of the lens. This simulation is typically performed over a finely sampled spectrum of the full bandwidth as well as for a range of image planes to account for both refractive and diffractive chromatic dispersion.

Figure 8:
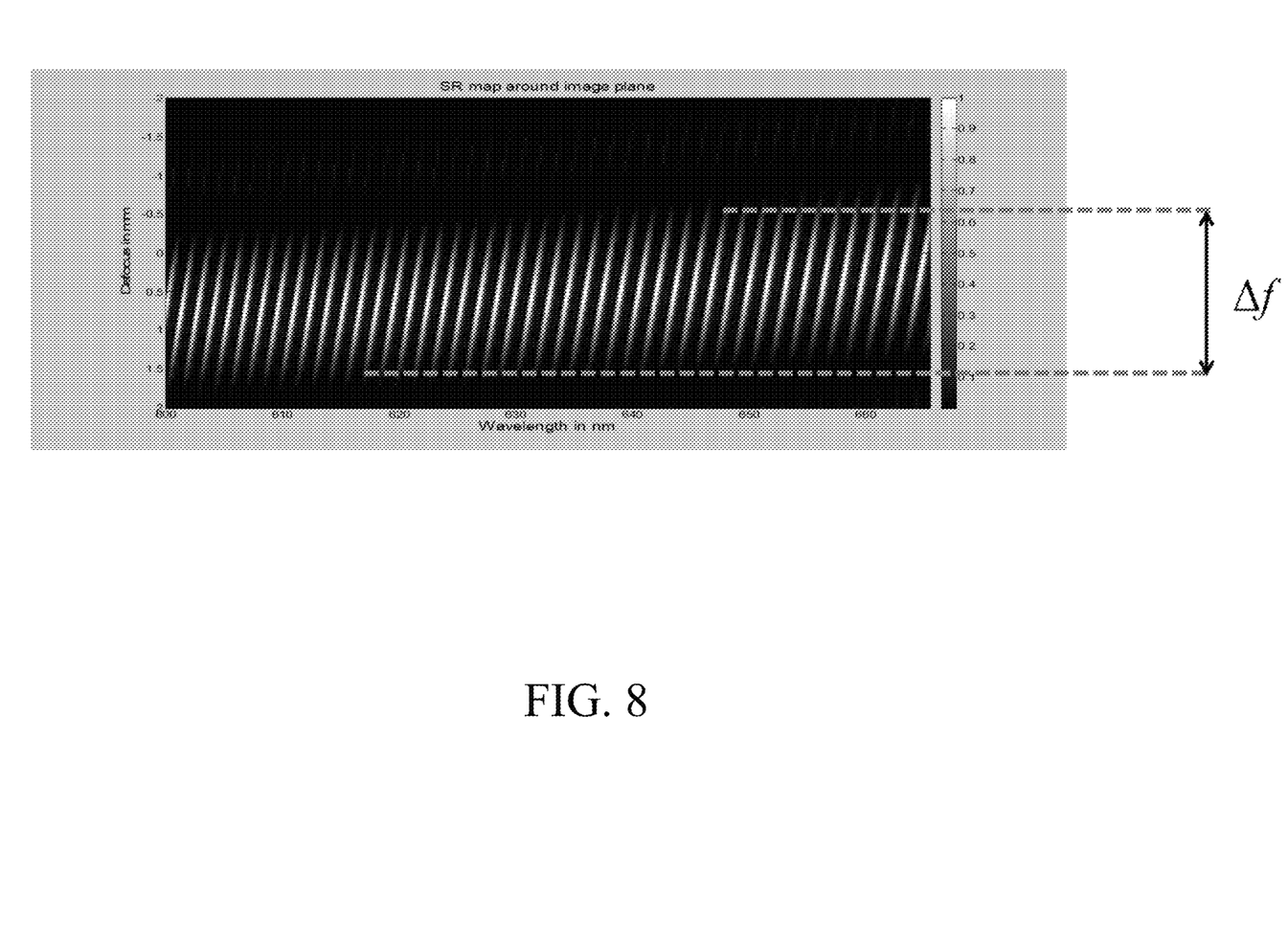
FIG. 8 shows an SR graph for a compensated system in accordance with the inventive principles and concepts, such as the optical device shown in FIG. 7, for example, which shows a reduced focal range due to achromatic compensation performed by the optical device.

FIG. 8 shows an SR graph for a compensated system in accordance with the inventive principles and concepts, such as the optical device 10 shown in FIG. 7, for example. The focal range is now reduced by almost a factor of 3 to Δf~1.5 mm compared to the uncompensated result shown in FIG. 5. The factor of three reduction of focal range in the provided example is significant in terms of image quality and post-processing overhead required to reconstruct images.

Figure 9:
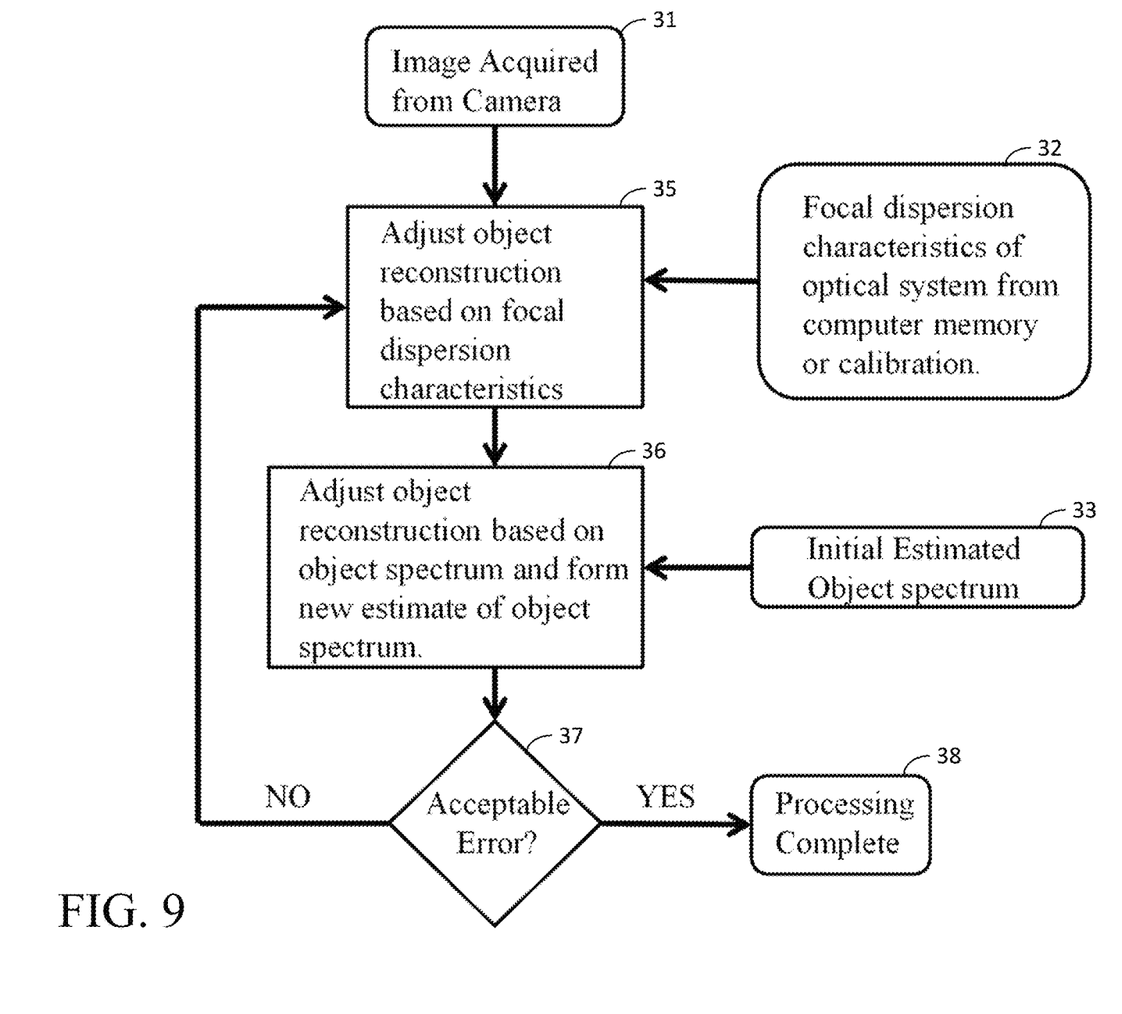
FIG. 9 shows a flow diagram of a computer algorithm for processing camera-plane image data obtained using the optical device shown in FIG. 7 to produce enhanced images.

FIG. 9 shows a flow diagram of a computer algorithm for use in an imaging system for processing camera-plane image data in accordance with an image processing algorithm to produce enhanced images. The system for capturing the images may have the configuration shown in FIG. 4, except that the MOD-DFL shown in FIG. 4 would be replaced by the optical device 10 shown in FIG. 7. First, the image is acquired from the camera, as indicated by block 31. The image processing algorithm uses data from knowledge of the MOD-Enmat focal dispersion, as indicated by block 32, and initial estimated object spectrum, as indicated by block 33, to form an estimated object reconstruction, as indicated by blocks 35 and 36. As a part of the object reconstruction, an improved estimate of the object spectrum is obtained at the step represented by block 36. A determination is made at block 37 as to whether the error consistency of the estimate is not less than a predetermined threshold value. If it is not, the process returns to block 35 and image processing continues by calculating a new estimate of the object and a new estimated object spectrum. If a determination is made at block 37 that the error consistency is below the predetermined threshold value, the image processing is complete, as indicated by block 38.

The focal dispersion data (block 32) can be precalculated and stored in computer memory, or it can be determined from calibration experiments using a known optical system. The initial object spectrum information can be estimated from the first camera image or predetermined and stored in computer memory.

It should be noted that many variations may be made to the optical device 10 shown in FIG. 7 within the scope of the inventive principles and concepts. For example, although the MOD-DFL 20 and the DFL 32 are shown disposed on opposite sides of the same optical substrate 12, the MOD-DFL 20 and the DFL 30 may be on respective surfaces that are not interconnected. In other words, the MOD-DFL 20 may be on one element and the DFL 30 may be on a surface of another element. The MOD-DFL 20 and the DFL 30 could also be combined on the same surface. It should also be noted that the surfaces on which the MOD-DFL 20 and the DFL 30 are disposed may be curved surfaces can be curved to reduce other forms of aberration. Also, achromatic compensation mechanisms other than the DFL 30 may be used to compensate for the refractive dispersion created by the MOD-DFL 20. For example, a textured subwavelength hole array formed in the bottom surface 12b can perform the same function. In addition, a variety of changes may be made to the algorithm described above with reference to FIG. 9 within the scope of the inventive principles and concepts. It should also be noted that the optical device 10 may be used in a variety of applications with a variety of systems, such as spectrometer and telescopes, for example.

ASPECTS

The following are some aspects in accordance with the inventive principles and concepts disclosed herein. In accordance with one aspect, an optical device is provided comprising a first optical substrate, a MOD-DFL and an achromatic compensation mechanism. The MOD-DFL comprises a first surface profile formed in a top surface of the optical substrate. The first surface profile is radially symmetric relative to a center axis of the MOD-DFL. The first surface profile comprises N transitions in the top surface at N radial positions, respectively, from the center axis, where N is a positive integer that is greater than or equal to 2. Each of the N transitions occurs at a respective zone boundary and has a predetermined first step height. The achromatic compensation mechanism is coupled to or formed on the bottom surface of the first optical substrate. The achromatic compensation mechanism compensates for refractive dispersion created by the MOD-DFL to reduce a focal range of the MOD-DFL.

In accordance with another aspect, the achromatic compensation mechanism is a single-order DFL.

In accordance with another aspect, the single-order DFL comprises a second surface profile formed in the bottom surface of the optical substrate. The second surface profile is radially symmetric relative to a center axis of the DFL that is aligned with the center axis of the MOD-DFL. The second surface profile comprises P transitions in the bottom surface at P radial positions, respectively, from the center axis of the DFL, where P is a positive integer that is greater than or equal to 2. Each of the P transitions occurs at a respective zone boundary of the second surface profile and has a predetermined second step height.

In accordance with another aspect, the optical device further comprises a second optical substrate coupled to the first optical substrate. The single-order DFL comprises a second surface profile formed in a surface of the second optical substrate. The second surface profile is radially symmetric relative to a center axis of the DFL that is aligned with the center axis of the MOD-DFL. The second surface profile comprises P transitions in the surface of the second optical substrate at P radial positions, respectively, from the center axis of the DFL, where P is a positive integer that is greater than or equal to 2. Each of the P transitions occurs at a respective zone boundary of the second surface profile and has a predetermined second step height.

In accordance with another aspect, each of the P transitions has a predetermined second step height. The predetermined first step height is approximately $$M \frac{\lambda}{n_2 - n_1},$$

where $\lambda$ is an optical path difference (OPD) wavelength and M is an order of the MOD-DFL. The predetermined second step height is approximately $$\frac{\lambda}{n_2 - n_1}.$$

In accordance with another aspect, the first surface profile is a continuous curve from the center axis to a closest of the N transitions to the center axis.

In accordance with another aspect, the MOD-DFL is an $M^{th}$ order MOD-DFL, where M is a positive integer that is greater than or equal to 50.

In accordance with another aspect, the predetermined first step height is the same for all of the transitions and is greater than or equal to 0.50 mm.

In accordance with another aspect, the transitions near an outer edge of the MOD-DFL are separated from one another by smaller radial distances than transitions near the center axis.

In accordance with another aspect, the present disclosure is directed to a method performed by an imaging system. The method comprises:

passing light from an object to be imaged through an optical device having a MOD-DFL disposed on a first side thereof and having an achromatic compensation mechanism disposed on an opposite side thereof; the achromatic compensation mechanism being configured to compensate for refractive dispersion created by the MOD-DFL to reduce a focal range of the MOD-DFL;

with a camera, focusing light passing through the optical device onto an optical sensor array located at a camera plane of the camera; the optical sensor array converting the light focused onto the optical sensor array into image data; and with a processor configured to perform an image enhancement algorithm on the image data, processing the image data to perform image enhancement.

In accordance with another aspect of the method, the MOD-DFL has any of the aforementioned aspects.

In accordance with another aspect of the method, the step of processing the image data includes:

a) reconstructing an image of the object based at least in part on focal dispersion characteristics of the MOD-DFL;

b) adjusting reconstruction of the image of the object based at least in part on an initial estimated object spectrum to obtain an updated estimated object spectrum;

c) determining whether or not an error consistency associated with the updated estimated object spectrum is less than or equal to a predetermined threshold value;

d) if it is determined at step c) that the error consistency associated with the updated estimated object spectrum is not less than or equal to the predetermined threshold value, reiterating steps a) through c) to further adjust reconstruction of the image of the object to obtain a new updated estimated object spectrum and to determine whether or not the error consistency associated with the new updated estimated object spectrum is less than or equal to the predetermined threshold value; and if it is determined at step c) that the error consistency associated with the updated estimated object spectrum obtained at step b) is less than or equal to the predetermined threshold value, halting the processing of the image data.

In accordance with another aspect, the present disclosure discloses a non-transitory computer-readable medium comprising computer instructions for execution by a processor. The computer instructions comprises a set of computer instructions that perform an image enhancement algorithm on image data. The image data is captured with a camera that focuses light passing through an optical device onto an optical sensor array located at a camera plane of the camera. The optical sensor array converts the light focused onto the optical sensor array into the image data. The light passes from an object being imaged through an optical device having a MOD-DFL disposed on a first side thereof and an achromatic compensation mechanism disposed on an opposite side. The achromatic compensation mechanism is configured to compensate for refractive dispersion created by the MOD-DFL to reduce a focal range of the MOD-DFL.

In accordance with another aspect of the non-transitory computer-readable medium, the set of computer instructions comprises:

a first code segment for reconstructing an image of the object based at least in part on focal dispersion characteristics of the MOD-DFL;

a second code segment for adjusting reconstruction of the image of the object based at least in part on an initial estimated object spectrum to obtain an updated estimated object spectrum; and a third code segment for determining whether or not an error consistency associated with the updated estimated object spectrum is less than or equal to a predetermined threshold value. If it is determined by the third code segment that the error consistency associated with the updated estimated object spectrum is not less than or equal to the predetermined threshold value, the first, second and third code segments are reiterated to further adjust reconstruction of the image of the object to obtain a new updated estimated object spectrum and to determine whether or not the error consistency associated with the new updated estimated object spectrum is less than or equal to the predetermined threshold value. If the third code segment determines that the error consistency associated with the updated estimated object spectrum obtained by the second code segment is less than or equal to the predetermined threshold value, the third code segment causes the processing of the image data to halt.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. An optical device comprising:
    a first optical substrate having a bottom surface and a top surface;
    a multi-order diffractive Fresnel lens (MOD-DFL) comprising a first surface profile formed in the top surface, the first surface profile being radially symmetric relative to a center axis of the MOD-DFL, the first surface profile comprising N transitions in the top surface at N radial positions, respectively, from the center axis, where N is a positive integer that is greater than or equal to 2, each of the N transitions occurring at a respective zone boundary and having a predetermined first step height; and
    an achromatic compensation mechanism coupled to or formed on the bottom surface of the first optical substrate for compensating for refractive dispersion created by the MOD-DFL to reduce a focal range of the MOD-DFL.

2. The optical device of claim 1, wherein the achromatic compensation mechanism is a single-order DFL.

3. The optical device of claim 2, wherein the single-order DFL comprises a second surface profile formed in the bottom surface, the second surface profile being radially symmetric relative to a center axis of the DFL that is aligned with the center axis of the single-order MOD-DFL, the second surface profile comprising P transitions in the bottom surface at P radial positions, respectively, from the center axis of the single-order DFL, where P is a positive integer that is greater than or equal to 2, each of the P transitions occurring at a respective zone boundary of the second surface profile and having a predetermined second step height.

4. The optical device of claim 2, further comprising:
    a second optical substrate coupled to the first optical substrate, the single-order DFL comprising a second surface profile formed in a surface of the second optical substrate, the second surface profile being radially symmetric relative to a center axis of the single-order DFL that is aligned with the center axis of the MOD-DFL, the second surface profile comprising P transitions in the surface of the second optical substrate at P radial positions, respectively, from the center axis of the single-order DFL, where P is a positive integer that is greater than or equal to 2, each of the P transitions occurring at a respective zone boundary of the second surface profile and having a predetermined second step height.

5. The optical device of claim 2, wherein the achromatic compensation mechanism is the single-order DFL, the single-order DFL comprising a second surface profile that is radially symmetric relative to a center axis of the single-order DFL that is aligned with the center axis of the MOD-DFL, the second surface profile comprising P transitions at P radial positions, respectively, from the center axis of the single-order DFL, where P is a positive integer that is greater than or equal to 2, each of the P transitions occurring at a respective zone boundary of the second surface profile and having a predetermined second step height, and wherein the predetermined first step height is approximately $$M \frac{\lambda}{n_2 - n_1},$$

where $\lambda$ is an optical path difference (OPD) wavelength and M is an order of the MOD-DFL, and wherein the predetermined second step height is approximately $$\frac{\lambda}{n_2 - n_1}.$$

6. The optical device of claim 1, wherein the first surface profile is a continuous curve from the center axis to a closest of the N transitions to the center axis.

7. The optical device of claim 1, wherein the MOD-DFL is an $M^{th}$ order MOD-DFL, where M is a positive integer that is greater than or equal to 50.

8. The optical device of claim 7, wherein the predetermined first step height is the same for all of the N transitions and is greater than or equal to 0.50 millimeters (mm).

9. The optical device of claim 1, wherein the transitions near an outer edge of the MOD-DFL are separated from one another by smaller radial distances than transitions near the center axis of the MOD-DFL.

10. An imaging system comprising:
    passing light from an object to be imaged through an optical device having a multi-order diffractive Fresnel lens (MOD-DFL) disposed on a first side thereof and having an achromatic compensation mechanism disposed on an opposite side thereof, the achromatic compensation mechanism being configured to compensate for refractive dispersion created by the MOD-DFL to reduce a focal range of the MOD-DFL;
    with a camera, focusing the light passing through the optical device onto an optical sensor array located at a camera plane of the camera, the optical sensor array converting the light focused onto the optical sensor array into image data; and
    with a processor configured to perform an image enhancement algorithm on the image data, processing the image data to perform image enhancement.

11. The imaging system of claim 10, wherein the MOD-DFL comprises a first surface profile formed in a first surface of the optical device, the first surface profile being radially symmetric relative to a center axis of the MOD-DFL, the first surface profile comprising N transitions in the first surface at N radial positions, respectively, from the center axis, where N is a positive integer that is greater than or equal to 2, each of the N transitions occurring at a respective zone boundary and having a predetermined first step height.

12. The imaging system of claim 10, wherein the achromatic compensation mechanism is a single-order DFL.

13. The imaging system of claim 12, wherein the single-order DFL comprises a second surface profile formed in a second surface of the optical device, the second surface profile being radially symmetric relative to a center axis of the single-order DFL that is aligned with the center axis of the MOD-DFL, the second surface profile comprising P transitions in the second surface at P radial positions, respectively, from the center axis of the single-order DFL, where P is a positive integer that is greater than or equal to 2, each of the P transitions occurring at a respective zone boundary of the second surface profile and having a predetermined second step height.

14. The imaging system of claim 12, wherein the achromatic compensation mechanism is the single-order DFL, the single-order DFL comprising a second surface profile that is radially symmetric relative to a center axis of the single-order DFL that is aligned with the center axis of the MOD-DFL, the second surface profile comprising P transitions at P radial positions, respectively, from the center axis of the single-order DFL, where P is a positive integer that is greater than or equal to 2, each of the P transitions occurring at a respective zone boundary of the second surface profile and having a predetermined second step height, and wherein the predetermined first step height is approximately $$M\frac{\lambda}{n_2 - n_1},$$

where λ is an optical path difference (OPD) wavelength and M is an order of the MOD-DFL, and wherein the predetermined second step height is approximately $$\frac{\lambda}{n_2 - n_1}.$$

15. The imaging system of claim 10, wherein the step of processing the image data includes:
a) reconstructing an image of the object based at least in part on focal dispersion characteristics of the MOD-DFL;
b) adjusting reconstruction of the image of the object based at least in part on an initial estimated object spectrum to obtain an updated estimated object spectrum;
c) determining whether or not an error consistency associated with the updated estimated object spectrum is less than or equal to a predetermined threshold value;
d) if it is determined at step c) that the error consistency associated with the updated estimated object spectrum is not less than or equal to the predetermined threshold value, reiterating steps a) through c) to further adjust reconstruction of the image of the object to obtain a new updated estimated object spectrum and to determine whether or not an error consistency associated with the new updated estimated object spectrum is less than or equal to the predetermined threshold value; and
if it is determined at step c) that the error consistency associated with the updated estimated object spectrum obtained at step b) is less than or equal to the predetermined threshold value, halting the processing of the image data.

16. A non-transitory computer-readable medium comprising a computer program for execution by a processor, the computer program comprising:
a set of computer instructions that perform an image enhancement algorithm on image data, processing the image data to perform image enhancement on the image data, the image data being captured with a camera that focuses light passing through an optical device onto an optical sensor array located at a camera plane of the camera, the optical sensor array converting the light focused onto the optical sensor array into said image data, the light passing from an object being imaged through an optical device having a multi-order diffractive Fresnel lens (MOD-DFL) disposed on a first side thereof and having an achromatic compensation mechanism disposed on an opposite side thereof, the achromatic compensation mechanism being configured to compensate for refractive dispersion created by the MOD-DFL to reduce a focal range of the MOD-DFL.

17. The non-transitory computer-readable medium of claim 16, wherein the set of computer instructions comprises:
a first code segment for reconstructing an image of the object based at least in part on focal dispersion characteristics of the MOD-DFL;
a second code segment for adjusting reconstruction of the image of the object based at least in part on an initial estimated object spectrum to obtain an updated estimated object spectrum; and
a third code segment for determining whether or not an error consistency associated with the updated estimated object spectrum is less than or equal to a predetermined threshold value, wherein if it is determined by the third code segment that the error consistency associated with the updated estimated object spectrum is not less than or equal to the predetermined threshold value, the first, second and third code segments are reiterated to further adjust reconstruction of the image of the object to obtain a new updated estimated object spectrum and to determine whether or not an error consistency associated with the new updated estimated object spectrum is less than or equal to the predetermined threshold value, and wherein if the third code segment determines that the error consistency associated with the updated estimated object spectrum obtained by the second code segment is less than or equal to the predetermined threshold value, the third code segment causes the processing of the image data to halt.

18. The non-transitory computer-readable medium of claim 17, wherein the MOD-DFL comprises a first surface profile formed in a first surface of the optical device, the first surface profile being radially symmetric relative to a center axis of the MOD-DFL, the first surface profile comprising N transitions in the first surface at N radial positions, respectively, from the center axis, where N is a positive integer that is greater than or equal to 2, each of the N transitions occurring at a respective zone boundary and having a predetermined first step height.

19. The non-transitory computer-readable medium of claim 18, wherein the achromatic compensation mechanism is a single-order DFL.

20. The non-transitory computer-readable medium of claim 19, wherein the single-order DFL comprises a second surface profile formed in a second surface of the optical device, the second surface profile being radially symmetric relative to a center axis of the single-order DFL that is aligned with the center axis of the MOD-DFL, the second surface profile comprising P transitions in the second surface at P radial positions, respectively, from the center axis of the single-order DFL, where P is a positive integer that is greater than or equal to 2, each of the P transitions occurring at a respective zone boundary of the second surface profile and having a predetermined second step height.

* * * * *